US011912303B2

(12) United States Patent
Liu et al.

(10) Patent No.: US 11,912,303 B2
(45) Date of Patent: Feb. 27, 2024

(54) VEHICLE OBSTACLE-AVOIDANCE METHOD, APPARATUS AND VEHICLE (71) Applicant: Shanghai Quicktron Intelligent Technology Co., Ltd, Shanghai (CN)

(72) Inventors: Huiliang Liu, Shanghai (CN); Run Huang, Shanghai (CN); Wei Huang, Shanghai (CN); Leilei Xing, Shanghai (CN)

(73) Assignee: SHANGHAI QUICKTRON INTELLIGENT TECHNOLOGY CO., LTD, Shanghai (CN)

( * ) Notice: Subject to any disclaimer, the term of this patent is extended or adjusted under 35 U.S.C. 154(b) by 186 days.

(21) Appl. No.: 17/422,631

(22) PCT Filed: Apr. 18, 2019

(86) PCT No.: PCT/CN2019/083297
§ 371 (c)(1),
(2) Date: Jul. 13, 2021

(87) PCT Pub. No.: WO2019/129312
PCT Pub. Date: Jul. 4, 2019

(65) Prior Publication Data
US 2022/0089184 A1 Mar. 24, 2022

(30) Foreign Application Priority Data
Apr. 2, 2019 (CN) .......................... 201910262226.1

(51) Int. Cl.
*B60W 60/00* (2020.01)
*G06V 20/58* (2022.01)
(Continued)

(52) U.S. Cl.
CPC ........ *B60W 60/0011* (2020.02); *B60W 30/04* (2013.01); *B60W 30/09* (2013.01);
(Continued)

(58) Field of Classification Search
CPC .. B60W 60/0011; B60W 30/04; B60W 30/09; B60W 30/162; B60W 40/105;
(Continued)

(56) References Cited

U.S. PATENT DOCUMENTS 10,144,399 B2 12/2018 Sugano et al.
10,214,211 B2 2/2019 Kobayashi et al.
(Continued)

FOREIGN PATENT DOCUMENTS

CN 102951158 A 3/2013
CN 105539434 A 5/2016
(Continued)

OTHER PUBLICATIONS

PCT/CN2019/083297—International Search Report, dated Jan. 8, 2020, 5 pages. (no English translation).
(Continued)

*Primary Examiner* — Jason Holloway
(74) *Attorney, Agent, or Firm* — Getech Law LLC; Jun Ye (57) ABSTRACT Provided are a vehicle obstacle-avoidance method, an apparatus, and a vehicle. The method includes: acquiring obstacle information, in a case that an obstacle is detected; determining whether the obstacle is a straight-going obstacle in a planned route, according to the planned route and the obstacle information; acquiring a center-of-gravity position of a vehicle, a safe stopping distance and a vehicle current speed, in a case that the obstacle is determined as the straight-going obstacle in the planned route; determining a maximum acceleration of the vehicle, according to the center-of-gravity position; and determining a straight-going obstacle-avoidance strategy, according to the obstacle information, the maximum acceleration, the safe stopping distance and the vehicle current speed. In the present applica- (Continued)

tion, current actions as well as load conditions of the vehicle are considered to determine the obstacle-avoidance strategy, thereby improving safety of the vehicle while ensuring execution of obstacle-avoidance.

13 Claims, 5 Drawing Sheets

(51) Int. Cl.
  B60W 30/04 (2006.01)
  B60W 30/09 (2012.01)
  B60W 30/16 (2020.01)
  B60W 40/105 (2012.01)
  B60W 40/13 (2012.01)
(52) U.S. Cl.
  CPC ........ *B60W 30/162* (2013.01); *B60W 40/105* (2013.01); *B60W 40/13* (2013.01); *B60W 60/0015* (2020.02); *G06V 20/58* (2022.01); B60W 2040/1315 (2013.01); B60W 2520/105 (2013.01); B60W 2554/80 (2020.02)
(58) Field of Classification Search
  CPC ............. B60W 40/13; B60W 60/0015; B60W 2040/1315; B60W 2520/105; B60W 2554/80; B60W 10/18; G06V 20/58; B60T 7/22
  See application file for complete search history.

(56) References Cited

U.S. PATENT DOCUMENTS

| 2010/0198491 | A1 | 8/2010 | Mays | |
| 2012/0179349 | A1* | 7/2012 | Yamakado | B60W 30/045 701/89 |
| 2013/0116874 | A1* | 5/2013 | Ichinose | B60L 15/20 701/22 |
| 2018/0126968 | A1* | 5/2018 | Eckert | B60T 8/323 |
| 2020/0070818 | A1* | 3/2020 | Tominaga | B60W 10/20 |

FOREIGN PATENT DOCUMENTS

| CN | 205292835 U | 6/2016 |
| CN | 106406307 A | 2/2017 |
| CN | 106515725 A | 3/2017 |
| CN | 107010075 A | 8/2017 |
| CN | 108100079 A | 6/2018 |
| JP | 2018052444 A | 4/2018 |

OTHER PUBLICATIONS

CN 2019102622261—Search Report, dated Jan. 21, 2020, 5 pages. (no English translation).
CN 2019102622261—First Office Action, dated Feb. 3, 2020, 20 pates. (with English translation).

* cited by examiner

FIG. 4 front of the vehicle

VEHICLE OBSTACLE-AVOIDANCE METHOD, APPARATUS AND VEHICLE

CROSS-REFERENCE TO RELATED APPLICATIONS

This application is a national stage application of PCT International Application No. PCT/CN2019/083297, filed on Apr. 18, 2019, which claims priority of to Chinese patent application No. 201910262226.1 filed in the Chinese Patent Office on Apr. 2, 2019 and entitled "VEHICLE OBSTACLE-AVOIDANCE METHOD, APPARATUS AND VEHICLE", which is incorporated by reference herein in its entirety.

TECHNICAL FIELD

The present application relates to the technical field of autonomous driving, in particular to a vehicle obstacle-avoidance method and apparatus and a vehicle.

BACKGROUND

At present, intelligent driving is booming. No matter in unmanned storage environments or in man-machine mixed factory workshop environments, driverless vehicles are more and more widely used, and the driving environment of driverless vehicles is becoming more complicated. No matter in what environment, in the existing technical solutions, a driving path for a driverless vehicle is generally fixed, especially for a high-speed vehicle. In such application scenario arises the problem on how to avoid obstacles in a case that vehicle travels along a fixed path. The obstacle-avoidance here includes obstacle avoidance in a case of driving straight, turning and in-situ rotation.

In the existing obstacle-avoidance methods for driverless vehicles, there are path planning and control methods for getting around an obstacle by detecting obstacle information, and there are also control methods that directly control vehicle body to turn around to get around an obstacle through obstacle information. These methods only solve collision-avoidance problem from the perspective of kinematics, and have low safety.

SUMMARY

Embodiments of the present application provide a vehicle obstacle-avoidance method and apparatus and a vehicle to solve one or more technical problems in the prior art.

In a first aspect, an embodiment of the present application provides a vehicle obstacle-avoidance method, including:
  acquiring obstacle information, in a case that an obstacle is detected;
  determining whether the obstacle is a straight-going obstacle in a planned route, according to the planned route and the obstacle information;
  acquiring a center-of-gravity position of a vehicle, a safe stopping distance and a vehicle current speed, in a case that the obstacle is determined as the straight-going obstacle in the planned route;
  determining a maximum acceleration of the vehicle, according to the center-of-gravity position; and
  determining a straight-going obstacle-avoidance strategy, according to the obstacle information, the maximum acceleration, the safe stopping distance and the vehicle current speed.

In an embodiment, the acquiring the center-of-gravity position of the vehicle, includes: acquiring pre-stored center-of-gravity position data of the vehicle, or acquiring vehicle weight and determining the center-of-gravity position of the vehicle according to the vehicle weight.

In an embodiment, the acquiring the vehicle weight, includes: acquiring force data of a plurality of preset force measurement points of the vehicle before the vehicle starts to move and force data of the plurality of preset force measurement points of the vehicle when the vehicle starts to move with an acceleration.

The determining the center-of-gravity position of the vehicle according to the vehicle weight, includes:
  determining the center-of-gravity position, according to the force data of the plurality of preset force measurement points of the vehicle before the vehicle starts to move, the force data of the plurality of preset force measurement points of the vehicle when the vehicle starts to move with the acceleration, and positions of the preset force measurement points.

In an embodiment, the determining the maximum acceleration of the vehicle according to the center-of-gravity position, includes:
  determining an acceleration at which the vehicle is in a critical state of overturning during deceleration as the maximum acceleration, according to the center-of-gravity position.

In an embodiment, the determining the straight-going obstacle-avoidance strategy, includes: determining a deceleration-for-obstacle-avoidance position and an obstacle-avoidance acceleration.

In an embodiment, the determining the deceleration-for-obstacle-avoidance position, includes:
  determining a deceleration distance for the vehicle to execute the straight-going obstacle-avoidance strategy, according to the vehicle current speed and the obstacle-avoidance acceleration; and
  determining the deceleration-for-obstacle-avoidance position, according to the obstacle information, the deceleration distance and the safe stopping distance, wherein a distance between the deceleration-for-obstacle-avoidance position and the obstacle is less than a sum of the deceleration distance and the safe stopping distance.

In an embodiment, the method further includes:
updating a distance between the vehicle and the obstacle in real time, according to a time stamp of the obstacle information and a driving trajectory of the vehicle; and
decelerating with the obstacle avoidance-acceleration, in a case that the distance between the vehicle and the obstacle is less than the sum of the deceleration distance and the safe stopping distance.

In an embodiment, the method further includes:
executing an obstacle-for-rotation avoidance strategy in a case that the obstacle is determined as an obstacle-for-rotation, according to the planned route and the obstacle information; wherein the obstacle-for-rotation includes an obstacle located in a rotation radius defined in the planned route.

The obstacle-for-rotation avoidance strategy includes:
controlling the vehicle to stop rotating, in a case that the vehicle is currently performing rotation according to the planned route; and
controlling the vehicle not to perform rotation, in a case that the vehicle have not performed rotation according to the planned route.

In a second aspect, an embodiment of the present application provides a vehicle obstacle-avoidance apparatus, including:

- a first information acquisition module configured for acquiring obstacle information, in a case that an obstacle is detected;
- a straight-going obstacle determining module configured for determining whether the obstacle is a straight-going obstacle in a planned route, according to the planned route and the obstacle information;
- a second information acquisition module configured for acquiring a center-of-gravity position of a vehicle, a safe stopping distance and a vehicle current speed, in a case that the obstacle is determined as the straight-going obstacle on the planned route;
- a maximum acceleration determining module configured for determining a maximum acceleration of the vehicle, according to the center-of-gravity position; and
- a straight-going obstacle-avoidance strategy determining module configured for determining a straight-going obstacle-avoidance strategy, according to the obstacle information, the maximum acceleration, the safe stopping distance and the vehicle current speed.

In an embodiment, the acquiring the center-of-gravity position of the vehicle, includes: obtaining pre-stored center-of-gravity position data of the vehicle, or acquiring vehicle weight and determining the center-of-gravity position of the vehicle according to the vehicle weight.

In an embodiment, the acquiring the vehicle weight, includes: acquiring force data of a plurality of preset force measurement points of the vehicle before the vehicle starts to move and force data of the plurality of preset force measurement points of the vehicle when the vehicle starts to move with an acceleration.

The determining the center-of-gravity position of the vehicle according to the vehicle weight, includes:

determining the center-of-gravity position, according to the force data of the plurality of preset force measurement points of the vehicle before the vehicle starts to move, the force data of the plurality of preset force measurement points of the vehicle when the vehicle starts to move with the acceleration, and positions of the preset force measurement points.

In an embodiment, the determining the maximum acceleration of the vehicle according to the center-of-gravity position, includes:

determining an acceleration at which the vehicle is in a critical state of overturning during deceleration as the maximum acceleration, according to the center-of-gravity position.

In an embodiment, the straight-going obstacle-avoidance strategy determining module includes:

- an obstacle-avoidance position determining unit configured for determining a deceleration-for-obstacle-avoidance position; and
- an obstacle-avoidance acceleration determining unit configured for determining an obstacle-avoidance acceleration.

The obstacle-avoidance position determining unit includes:

- a deceleration distance determining subunit configured for determining a deceleration distance for the vehicle to execute the straight-going obstacle-avoidance strategy, according to the vehicle current speed and the obstacle-avoidance acceleration; and
- an obstacle-avoidance position determining subunit configured for determining the deceleration-for-obstacleavoidance position, according to the obstacle information, the deceleration distance and the safe stopping distance, wherein a distance between the deceleration-for-obstacle-avoidance position and the obstacle is less than a sum of the deceleration distance and the safe stopping distance.

In an embodiment, the apparatus further includes:
- an obstacle distance update module configured for updating a distance between the vehicle and the obstacle in real time, according to a time stamp of the obstacle information and a driving trajectory of the vehicle; and
- a straight-going obstacle-avoidance strategy execution module configured for decelerating with the obstacle-avoidance acceleration, in a case that the distance between the vehicle and the obstacle is less than the sum of the deceleration distance and the safe stopping distance.

In an embodiment, the apparatus further includes:
- a obstacle-for-rotation avoidance module configured for executing an obstacle-for-rotation avoidance strategy in a case that the obstacle is determined as an obstacle for rotation, according to the planned route and the obstacle information;
- wherein the obstacle-for-rotation includes an obstacle located in a rotation radius defined in the planned route.

The obstacle-for-rotation avoidance strategy includes:
- controlling the vehicle to stop rotating, in a case that the vehicle is currently performing rotation according to the planned route; and
- controlling the vehicle not to perform rotation, in a case that the vehicle have not performed rotation according to the planned route.

In a third aspect, an embodiment of the present application provides a vehicle obstacle-avoidance apparatus. Functions of the apparatus can be realized by hardware, or by hardware executing corresponding software. The hardware or software includes one or more modules corresponding to the foregoing functions.

In a possible design, structures of the apparatus include a processor and a memory. The memory is configured to store a program that supports the apparatus to execute the foregoing vehicle obstacle-avoidance method. The processor is configured to execute the program stored in the memory. The apparatus may further include a communication interface for communicating with other devices or a communication network.

In a fourth aspect, an embodiment of the present application provides a vehicle, including the vehicle obstacle-avoidance apparatus provided in any of the foregoing embodiments.

In a fifth aspect, an embodiment of the present application provides a computer-readable storage medium for storing computer software instructions used by a vehicle obstacle-avoidance apparatus, which includes a program for executing the foregoing vehicle obstacle-avoidance method.

One of the foregoing technical solutions has the following advantages or beneficial effects: the foregoing method not only considers avoiding collisions with the straight-going obstacle, but also takes the maximum acceleration determined according to the center-of-gravity position and the vehicle current speed as one of consideration factors of the obstacle-avoidance strategy. That is, current actions as well as load conditions of the vehicle are also considered to determine the obstacle-avoidance strategy, thereby improving safety of the vehicle while ensuring execution of obstacle-avoidance.

The above summary is only for the purpose of description and is not intended to be limiting in any way. In addition to the illustrative aspects, embodiments, and features described above, by referring to the accompanying drawings and the following detailed description, further aspects, embodiments, and features of the present application will be easily understood.

BRIEF DESCRIPTION OF THE DRAWINGS

In the drawings, unless otherwise specified, same reference numerals refer to the same or similar components or elements throughout the multiple drawings. These drawings are not necessarily drawn to scale. It is to be understood that these drawings only depict some embodiments of the present application, and should not be regarded as limitations to the scope of the present application.

DETAILED DESCRIPTION

In the following, only some exemplary embodiments are briefly described. As will be appreciated by those skilled in the art, the described embodiments may be modified in various ways without departing from the spirit or scope of the present application. Accordingly, the drawings and description are to be regarded as illustrative in nature and not as restrictive.

One embodiment of the present application provides a vehicle obstacle-avoidance method, which may be suitable for autonomous driving vehicles. This embodiment is not only applicable to an unmanned storage environment and a factory workshop environment where a man-machine is mixed, but also an environment where a driverless car is driving on a road.

Figure 1:
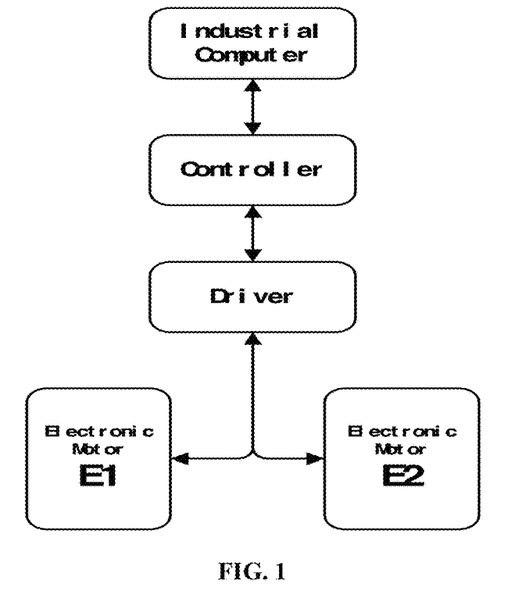
FIG. 1 shows a schematic diagram of drive control components of a vehicle to which an embodiment of the present application is applicable.

For example, drive control components of a vehicle include but are not limited to: an industrial computer, a controller, a driver, and a motor. Referring to FIG. 1, the industrial computer, the controller, the driver and the motor are connected in sequence. There may be two motors, such as a motor E1 and a motor E2 shown in FIG. 1. The driver is connected to the motor E1 and the motor E2, respectively.

Specifically, after the industrial computer receives a task instruction from a scheduling system, the industrial computer parses the task instruction, including parsing a planning path from the task instruction. The industrial computer sends the parsed planned route to the controller. The controller plans a current trajectory curve according to path attributes such as a starting position and a target position included in the planned route, thereby controlling the vehicle to drive according to the trajectory curve.

The planned route is determined according to the received task instruction, vehicle conditions and road conditions in the environment. The task instruction may include a target route and a target position specified by the user. The vehicle conditions and road conditions in the environment may be acquired from a command center of the current road. Further, after further planning for the vehicle conditions and road conditions in the environment, the command center of the current road may send a command to the vehicle, such as whether the vehicle can pass through an intersection at a current moment.

In addition, under the control of the controller, the driver and the motors are used to drive the vehicle to move.

Figure 2:
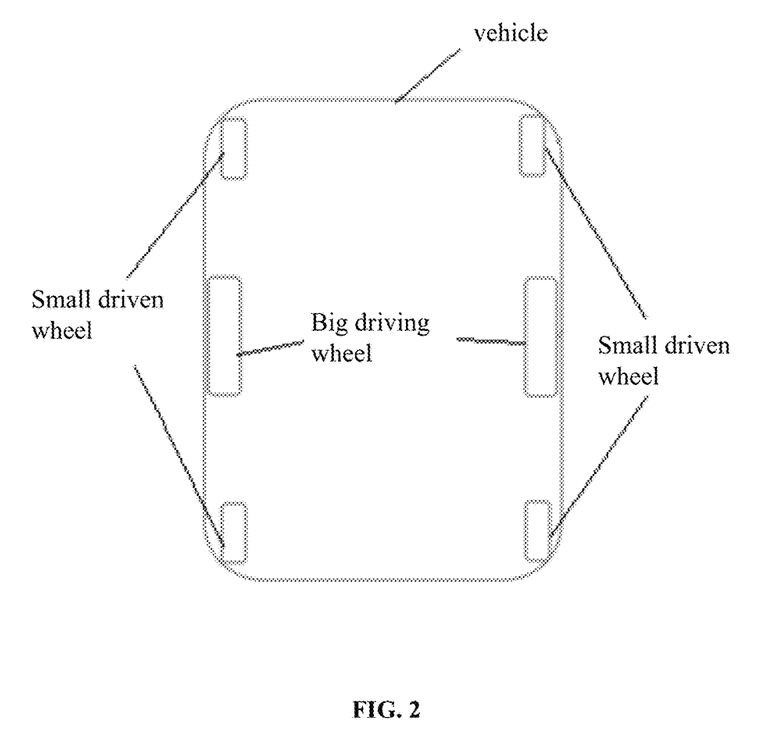
FIG. 2 shows a schematic diagram of wheels of a vehicle to which an embodiment of the present application is applicable.

For example, referring to FIG. 2, an autonomous driving vehicle may include two driving wheels and four driven wheels. FIG. 2 shows a horizontal section of the vehicle along a motion plane. The driven wheels are located at four corners of the plane. The two driving wheels are located at two sides of the vehicle, and each driving wheel is located in a middle of two driven wheels.

Figure 3:
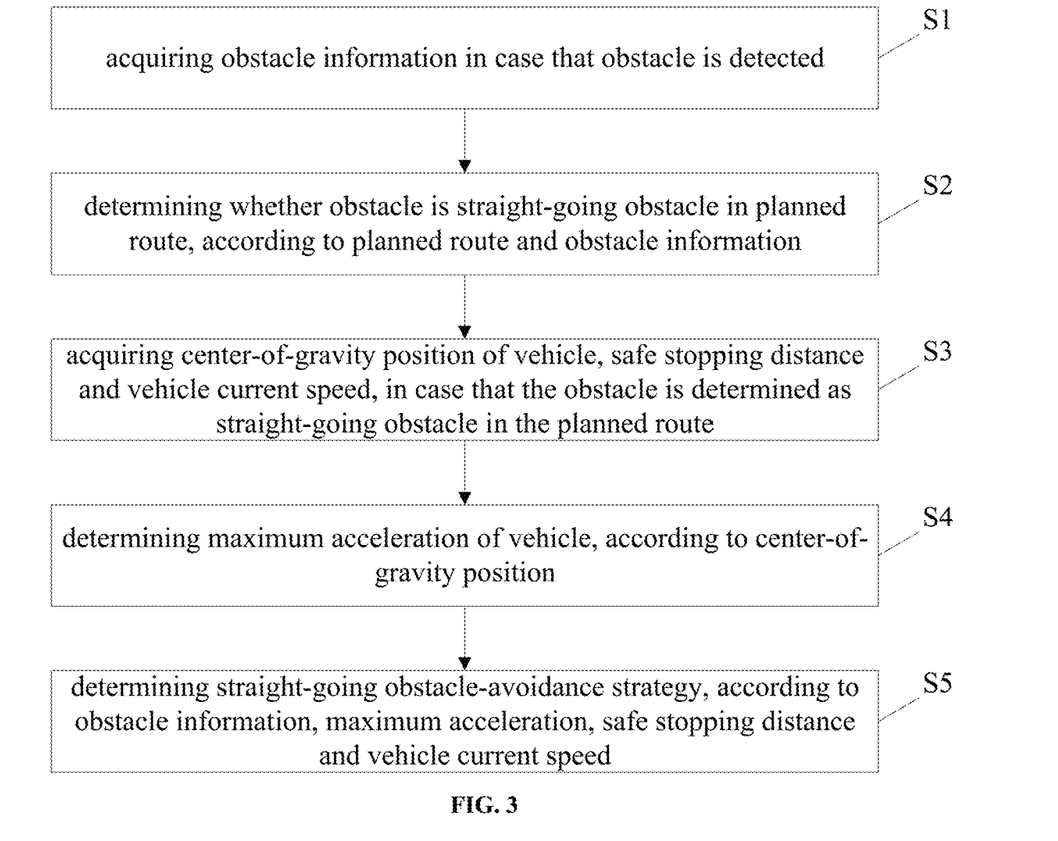
FIG. 3 shows a flowchart of a vehicle obstacle-avoidance method according to an embodiment of the present application.

FIG. 3 shows a flowchart of a vehicle obstacle-avoidance method according to an embodiment of the present application. As shown in FIG. 3, the method includes:

S1: acquiring obstacle information in a case that an obstacle is detected;

S2: determining whether the obstacle is a straight-going obstacle in a planned route, according to the planned route and the obstacle information S3: acquiring a center-of-gravity position of a vehicle, a safe stopping distance and a vehicle current speed, in a case that the obstacle is determined as the straight-going obstacle in the planned route;

S4: determining a maximum acceleration of the vehicle, according to the center-of-gravity position; and S5: determining a straight-going obstacle-avoidance strategy, according to the obstacle information, the maximum acceleration, the safe stopping distance and the vehicle current speed.

The foregoing method not only considers avoiding collisions with the straight-going obstacle, but also takes the maximum acceleration determined according to the center-of-gravity position and the vehicle current speed as one of consideration factors of the obstacle-avoidance strategy. That is, current actions as well as load conditions of the vehicle are also considered to determine the obstacle-avoidance strategy, thereby improving safety of the vehicle while ensuring execution of obstacle-avoidance.

In one embodiment, the method further includes a step S0: controlling the vehicle to drive according to a received planned route at a predetermined speed, and turn on detection of obstacles during a driving process.

In one embodiment, detection of obstacles may be performed by installing a lidar sensor, an ultrasonic radar sensor, and an image acquisition module on the vehicle.

Figure 4:
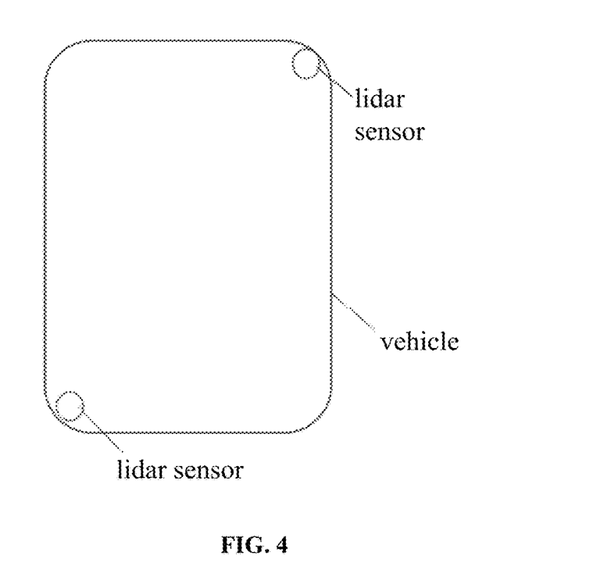
FIG. 4 shows a schematic layout diagram of an obstacle detection module applicable to an embodiment of the present application.

Referring to FIG. 4, apparatus for detecting obstacles may be installed at front and rear of the vehicle to detect obstacles in a straight-going direction of the vehicle.

It should be noted that the straight-going obstacle in the planned route, which is detected in the step S2, include: an obstacle, with which the vehicle collides with before reaching the target position, in a case that the vehicle keeps straight along the planned path. The obstacle may be of multiple types. For example, in a warehouse environment, walls, shelves, goods, other vehicles and persons may all be identified as obstacles.

In one embodiment, the obstacle information may include a distance between the vehicle and the obstacle and an orientation of the obstacle relative to the vehicle.

In one embodiment, the step S2 includes the steps:
- S21: acquiring a distance between the vehicle and a target position of a straight route to obtain a target distance D, in a case of determining that the vehicle is going on the straight route according to the planned route;
- S22: determining whether the obstacle is located in a straight-going direction of the vehicle; if so, determining a distance D2 between the vehicle and the obstacle;
- S23: determining whether the target distance D1 is greater than or equal to the distance D2 between the vehicle and the obstacle; if yes, determining the obstacle as a straight-going obstacle in the planned route; if not, determining that the obstacle is not a straight-going obstacle in the planned route, and not performing obstacle-avoidance.

In one embodiment, the obstacle information may be acquired by the controller of the vehicle, and the determining process in the foregoing step S2 may be executed by the controller.

In one embodiment, the acquiring the center-of-gravity position of the vehicle in the step S3 includes acquiring pre-stored center-of-gravity position data of the vehicle, or acquiring a vehicle weight and determining the center-of-gravity position of the vehicle according to the vehicle weight. The vehicle weight may include a vehicle body weight and/or a load weight.

In a case that the vehicle is only used for simple loading and unloading of goods, or the load weight is much smaller than the vehicle body weight, the vehicle body weight and the center-of-gravity position can be calculated directly through design of the vehicle itself, and then the center-of-gravity position of the vehicle is a fixed value. The center-of-gravity position may be stored in a database. At this point, the vehicle only needs to directly acquire the pre-stored center-of-gravity position data from the database.

In a case that the vehicle is mainly used for goods transportation, or the load weight is much greater than the vehicle body weight, it is usually necessary to install a force sensor on the vehicle, and acquire load force of the vehicle through the force sensor to determine the load weight.

In one embodiment, the acquiring the vehicle weight, includes: acquiring force data of a plurality of preset force measurement points of the vehicle before the vehicle starts to move and force data of the plurality of preset force measurement points of the vehicle when the vehicle starts to move with acceleration.

The center-of-gravity position of the vehicle is determined according to the force data of the plurality of preset force measurement points of the vehicle before the vehicle starts to move, the force data of the plurality of preset force measurement points of the vehicle when the vehicle starts to move with acceleration, and positions of the preset force measurement points.

In one embodiment, the force data at the force measurement point may be acquired by a force sensor installed at the force measurement point.

According to one embodiment, before the vehicle is loaded and ready to start to move, in a stationary condition, force data of the vehicle before the vehicle starts to move is acquired by the force sensor. In a process that the vehicle starts to move at a predetermined acceleration, force data of the vehicle when the vehicle starts to move is acquired by the force sensor.

The method calculates the center-of-gravity position based on the force data before and after the vehicle starts to move each time, and then determines a maximum acceleration based on the center-of-gravity position. Before and after the vehicle starts to move each time, the detection is performed to acquire new data, thus the method has strong versatility and can effectively avoid tedious work of setting parameters separately for different models and working conditions.

Figure 5:
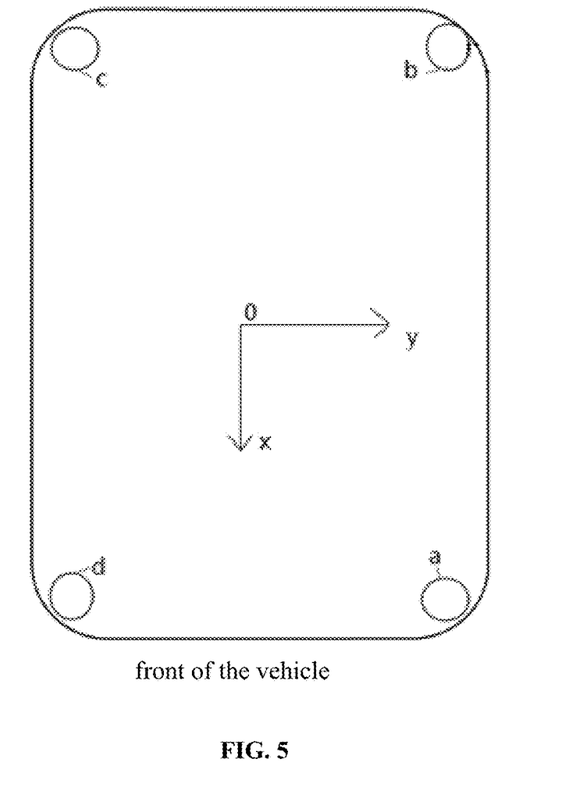
FIG. 5 shows a schematic layout diagram of force sensors to which an embodiment of the present application is applicable.
Figure 6:
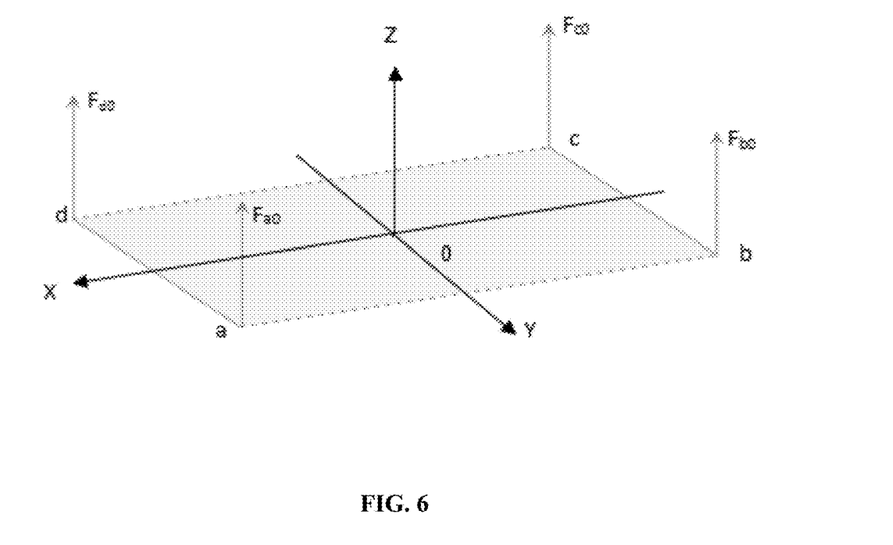
FIG. 6 shows a schematic diagram of a vehicle coordinate system to which an embodiment of the present application is applicable.

For example, there are four force sensors. Referring to FIG. 5 and FIG. 6, FIG. 5 is a layout of the four force sensors a, b, c, and d, where the force sensors are disposed at four corners at a vehicle motion plane. For example, in a case that the vehicle is used to carry goods, four sensors may be installed at four corners of a load-bearing surface of the vehicle, and mainly be used for acquiring force on the load-bearing surface. The vehicle motion plane/load-bearing surface is usually parallel to the ground plane.

The determining the center-of-gravity position, according to the force data of the force sensors before the vehicle starts to move, the force data of the force sensors when the vehicle starts to move with acceleration and positions of different force sensors, includes:

establishing a vehicle coordinate system; where referring to FIG. 6, an origin is at a center of the vehicle; an x-axis is along a longitudinal direction of the vehicle, and an x-axis positive direction is along a direction of a front of the vehicle; a y-axis is along a transverse direction of the vehicle; and a z-axis is perpendicular to the vehicle motion plan; the vehicle motion plane is usually parallel to the ground plane; considering the positions of the force sensors, the xy-axis plane is preferably coincident with a plane where the force sensors are located;

calculating coordinate points $(X_0, Y_0, Z_0)$ in the vehicle coordinate system through the following formulas (1a) (1b) (1c) as the center-of-gravity position:

$$X_0 = 0.5 * L_{ab} - (F_{b0} + F_{c0}) * L_{ab} / (F_{a0} + F_{b0} + F_{c0} + F_{d0}) \qquad (1a)$$

$$Y_0 = 0.5 * L_{bc} - (F_{d0} + F_{c0}) * L_{bc} / (F_{a0} + F_{b0} + F_{c0} + F_{d0}) \qquad (1b)$$

$$Z_0 = (x + 0.5 * L_{ab}) * g / a_0 + L_{ab} * (F_{a1} + F_{d1}) * g / (a_0 * (F_{a0} + F_{b0} + F_{c0} + F_{d0})) \qquad (1c)$$

where, "a", "b", "c", and "d" represent different force sensors, respectively; "a" is located in a first quadrant of the xy-axis plane; "b" is located in a second quadrant of the xy-axis plane; "c" is located in a third quadrant of the xy-axis plane; and "d" is located in a fourth quadrant of the xy-axis plane; $L_{ab}$ represents a distance between "a" and "b"; $L_{bc}$ represents a distance between "b" and "c"; $F_{a0}$, $F_{b0}$, $F_{c0}$, $F_{d0}$ respectively represent the force data of the four force sensors before the vehicle starts to move; $F_{a1}$, $F_{b1}$, $F_{c1}$ and $F_{d1}$ respectively represent the force data of the force sensors when the vehicle starts to move with an acceleration; $a_0$ represents the acceleration when the vehicle starts to move, and "g" represents the acceleration of gravity.

A center of a rectangle defined by the four force sensors coincides with the origin of the vehicle coordinate system, and a line where "a" and "b" are located is parallel to the x-axis, and a line where "b" and "c" are located is parallel to the y-axis.

The formula (1c) solves a vertical coordinate of the center-of-gravity by applying the moment balance condition to the goods of the vehicle.

In one embodiment, the step S4 includes the following steps S41-S42.

S41: determining an acceleration at which the vehicle is in a critical state of overturning during deceleration as the maximum acceleration, according to the center-of-gravity position. Generally, in a case that the vehicle is used for loading, or the weight of loaded goods is much greater than the vehicle body weight, the vehicle is likely to overturn in a case that the vehicle decelerates. Therefore, the overturning in the step S41 also considers the load of the vehicle.

In one embodiment, based on the foregoing exemplary process of calculating the coordinates of the center-of-gravity position, the maximum acceleration may be calculated through the following formula (2):

$$a_{max}=|x_0-0.5*L_{ab}|*g/z_0 \quad (2)$$

where, $a_{max}$ represents the maximum acceleration; the coordinate point ($X_0$, $Y_0$, $Z_0$) represents the center-of-gravity position.

S42: comparing a numerical value of the maximum acceleration with a numerical value of a rated acceleration $a_w$ of the vehicle, and taking a smaller value min ($a_{max}$, $a_w$) as a final maximum acceleration.

In the foregoing steps, by taking the acceleration at which the vehicle is in a critical state of overturning during deceleration as the maximum acceleration, the weight of the vehicle itself and/or load of the vehicle can be taken into consideration to avoid obstacles, which greatly improves safety.

In one embodiment, the determining the straight-going obstacle-avoidance strategy in the step S5 includes: determining a deceleration-for-obstacle-avoidance position and an obstacle-avoidance acceleration, where the obstacle-avoidance acceleration is used to reduce vehicle speed. One specific process of implementing the straight-going obstacle-avoidance strategy include: in a case that the vehicle is driving to the deceleration-for-obstacle-avoidance position, decelerating to a safe stop with the obstacle-avoidance acceleration.

In one embodiment, determining the obstacle-avoidance acceleration includes:

S501: determining a value obtained by subtracting a preset safety value from the maximum acceleration as the obstacle-avoidance acceleration. One specific formula is: a=min($a_{max}$,$a_w$)−$a_s$, where $a_s$ represents the preset safety value. By subtracting a certain safety value to reduce obstacle-avoidance acceleration, it can avoid dangers of overturning caused by excessive speed deceleration.

In one embodiment, determining the deceleration-for-obstacle-avoidance position includes the following steps S502 and S503.

S502: determining a deceleration distance for the vehicle to execute the straight-going obstacle-avoidance strategy, according to the vehicle current speed and the obstacle-avoidance acceleration.

After decelerating to a safe stop with the obstacle-avoidance acceleration, the vehicle speed is 0, one specific formula for obtaining the deceleration distance is:

$$D4=0.5*v_0^2/a$$

where, $v_0$ represents a vehicle current speed, which is a speed of the vehicle before the vehicle avoids obstacles, "a" represents an obstacle-avoidance acceleration, and D4 represents a deceleration distance.

S503: determining the deceleration-for-obstacle-avoidance position, according to the obstacle information, the deceleration distance and the safe stopping distance, where a distance between the deceleration-for-obstacle-avoidance position and the obstacle is less than a sum of the deceleration distance and the safe stopping distance, i.e., D2−D3<D4.

In a case of determining the obstacle as the straight-going obstacle in the planned route in the step S23, the method further includes updating the distance D2 between the vehicle and the obstacle in real time. One specific process includes the following steps S6-S8.

S6: updating the distance between the vehicle and the obstacle in real time, according to a time stamp of the obstacle information and a driving trajectory of the vehicle; where the vehicle can record the driving trajectory in real time while driving; the driving trajectory is recorded by the controller; and S7: decelerating with the obstacle avoidance-acceleration, in a case that the distance between the vehicle and the obstacle is less than the sum of the deceleration distance and the safe stopping distance.

For example, it is supposed that the obstacle is not moving and a current moment is T2. According to a time stamp of the obstacle information, a distance L1 between the vehicle and the obstacle can be determined at a moment T1. A distance L2 traveled by the vehicle from the moment T1 to the moment T2 can be known according to the driving track. Then, it can be inferred that a distance between the vehicle and the obstacle is L1−L2 at the current moment T2.

S8: decelerating with the obstacle avoidance-acceleration, in a case that the distance between the vehicle and the obstacle is less than the sum of the deceleration distance and the safe stopping distance, i.e., D2−D3<D4.

The foregoing steps S6 and S7 may be executed by the controller. The distance between the vehicle and the obstacle is determined in real time according to the time stamp of the obstacle information and its own driving trajectory, thereby realizing precise obstacle-avoidance control.

In another embodiment, the distance between the obstacle and the vehicle may also be directly detected in real time by a corresponding detection apparatus.

Figure 7:
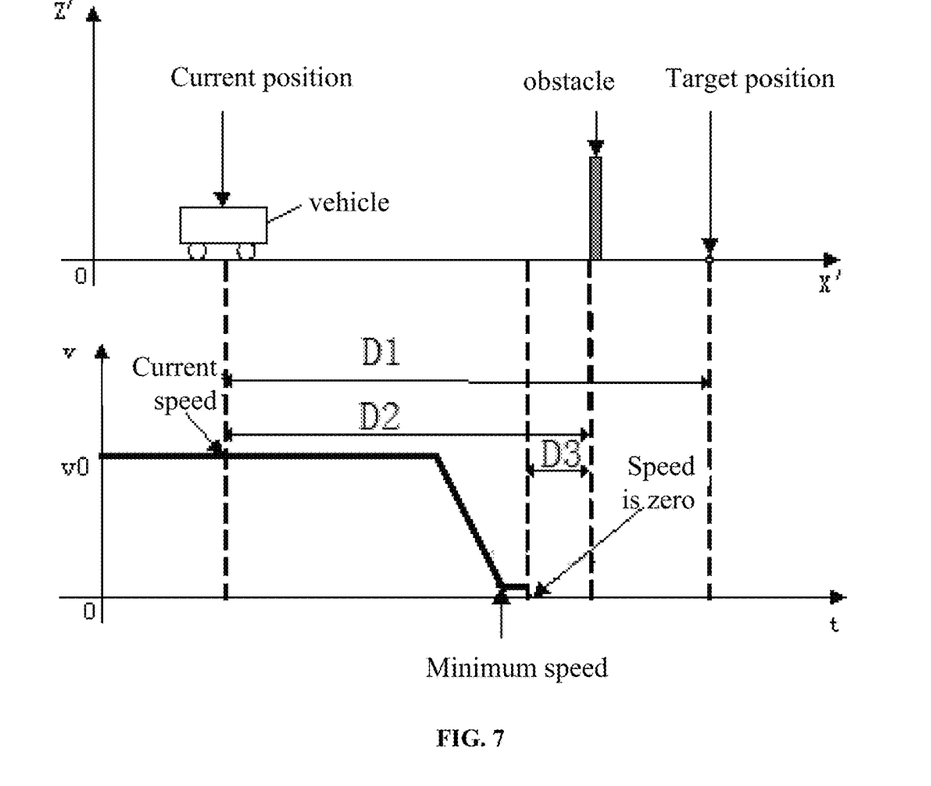
FIG. 7 is a schematic diagram shows speed changes of a vehicle in a case that the vehicle decelerates to avoid an obstacle, obtained by the vehicle obstacle-avoidance method according to an embodiment of the present application.

Refer to an example shown in FIG. 7, FIG. 7 shows speed changes of the vehicle in a case that the vehicle avoids a straight-going obstacle. The distance D2 between the vehicle and the obstacle is smaller than the distance D1 between the vehicle and the target position, and the vehicle needs to implement the straight-going obstacle-avoidance strategy that the vehicle is running at a constant speed at the beginning, and then decelerates with the obstacle avoidance-acceleration when running to the deceleration-for-obstacle-avoidance position until the vehicle speed is decelerated to zero. At this point, a safe stop is realized, and the safe stopping distance is D3.

In one embodiment, this embodiment further includes: detecting an obstacle around the vehicle body to meet requirements of avoiding obstacle-for-rotation.

In one embodiment, this embodiment further includes:

S9: executing an obstacle-for-rotation avoidance strategy in a case that the obstacle is determined as an obstacle-for-rotation, according to the planned route and the obstacle information; where the obstacle-for-rotation includes an obstacle located in a rotation area defined in the planned route, and the rotation area is usually a circular rotation area with a set rotation position point as a center and a predetermined rotation radius as a radius.

The obstacle-for-rotation avoidance strategy includes:
controlling the vehicle to decelerate to zero to stop rotating, in a case that the vehicle is currently performing rotation according to the planned route; and
controlling the vehicle not to perform rotation until the obstacle-for-rotation is removed away, in a case that the vehicle have not performed rotation according to the planned route.

In order to meet requirements of detecting obstacles around the vehicle body, an obstacle detection apparatus may be installed in a mode shown in FIG. 4: the obstacle detection apparatus may include two 360-degree detection lidar sensors. The two lidar sensors are respectively installed at two vertex angles in the horizontal plane of the vehicle, and the two vertex angles are located at a diagonal. Such installation mode can meet requirements of detecting obstacles in front of and around the vehicle body with a minimum number of obstacle detection apparatus.

Figure 8:
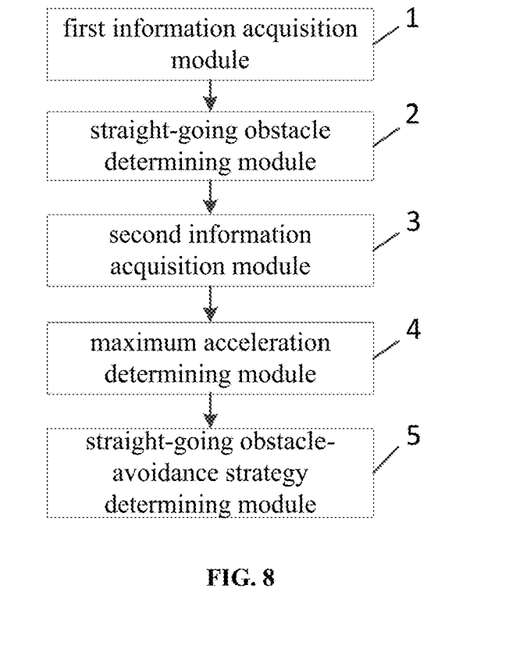
FIG. 8 shows a schematic structural diagram of a vehicle obstacle-avoidance apparatus according to an embodiment of the present application.

FIG. 8 shows a schematic structural diagram of a vehicle obstacle-avoidance apparatus according to an embodiment of the present application. The apparatus includes:
a first information acquisition module 1 configured for acquiring obstacle information, in a case that an obstacle is detected;
a straight-going obstacle determining module 2 configured for determining whether the obstacle is a straight-going obstacle in a planned route, according to the planned route and the obstacle information;
a second information acquisition module 3 configured for acquiring a center-of-gravity position of a vehicle, a safe stopping distance and a vehicle current speed, in a case that the obstacle is determined as the straight-going obstacle on the planned route;
a maximum acceleration determining module 4 configured for determining a maximum acceleration of the vehicle, according to the center-of-gravity position; and
a straight-going obstacle-avoidance strategy determining module 5 configured for determining a straight-going obstacle-avoidance strategy, according to the obstacle information, the maximum acceleration, the safe stopping distance and the vehicle current speed.

In one embodiment, the acquiring the center-of-gravity position of the vehicle, includes: obtaining pre-stored center-of-gravity position data of the vehicle, or acquiring vehicle weight and determining the center-of-gravity position of the vehicle according to the vehicle weight.

In one embodiment, the acquiring the vehicle weight, includes: acquiring force data of a plurality of preset force measurement points of the vehicle before the vehicle starts to move and force data of the plurality of preset force measurement points of the vehicle when the vehicle starts to move with an acceleration; and
the determining the center-of-gravity position of the vehicle according to the vehicle weight, includes:
determining the center-of-gravity position, according to the force data of the plurality of preset force measurement points of the vehicle before the vehicle starts to move, the force data of the plurality of preset force measurement points of the vehicle when the vehicle starts to move with the acceleration, and positions of the preset force measurement points.

In embodiment, the determining the maximum acceleration of the vehicle according to the center-of-gravity position, includes:
determining an acceleration at which the vehicle is in a critical state of overturning during deceleration as the maximum acceleration, according to the center-of-gravity position.

In one embodiment, the straight-going obstacle-avoidance strategy determining module 5 includes:
an obstacle-avoidance position determining unit 51 configured for determining a deceleration-for-obstacle-avoidance position; and
an obstacle-avoidance acceleration determining unit 52 configured for determining an obstacle-avoidance acceleration.

The obstacle-avoidance position determining unit 51 includes:
a deceleration distance determining subunit 511 configured for determining a deceleration distance for the vehicle to execute the straight-going obstacle-avoidance strategy, according to the vehicle current speed and the obstacle-avoidance acceleration; and
an obstacle-avoidance position determining subunit 512 configured for determining the deceleration-for-obstacle-avoidance position, according to the obstacle information, the deceleration distance and the safe stopping distance, wherein a distance between the deceleration-for-obstacle-avoidance position and the obstacle is less than a sum of the deceleration distance and the safe stopping distance.

In one embodiment, the apparatus further includes:
an obstacle distance update module 6 configured for updating a distance between the vehicle and the obstacle in real time, according to a time stamp of the obstacle information and a driving trajectory of the vehicle; and
a straight-going obstacle-avoidance strategy execution module 7 configured for decelerating with the obstacle-avoidance acceleration, in a case that the distance between the vehicle and the obstacle is less than the sum of the deceleration distance and the safe stopping distance.

In one embodiment, the apparatus further includes:
a obstacle-for-rotation avoidance module 8 configured for executing an obstacle-for-rotation avoidance strategy in a case that the obstacle is determined as an obstacle for rotation, according to the planned route and the obstacle information; where the obstacle-for-rotation includes an obstacle located in a rotation area defined in the planned route.

The obstacle-for-rotation comprises an obstacle located in a rotation radius defined in the planned route.

The obstacle-for-rotation avoidance strategy includes:
controlling the vehicle to stop rotating, in a case that the vehicle is currently performing rotation according to the planned route; and
controlling the vehicle not to perform rotation, in a case that the vehicle have not performed rotation according to the planned route.

Functions of the modules in the apparatus in the embodiments of the present application, may refer to the corresponding descriptions in the foregoing methods, which will not be described herein again.

Figure 9:
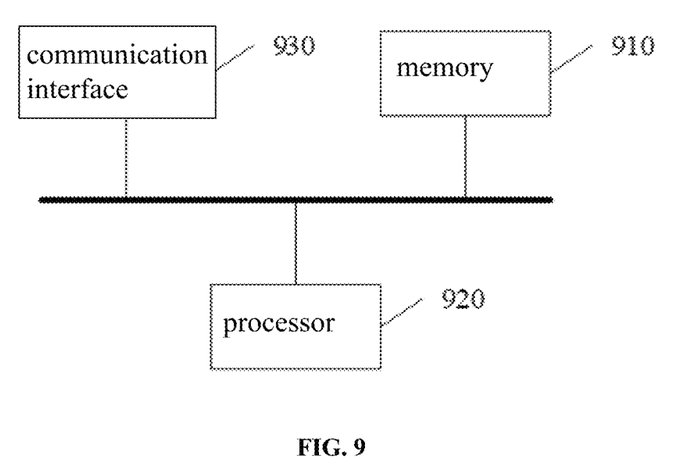
FIG. 9 shows a schematic structural diagram of another vehicle obstacle-avoidance apparatus according to an embodiment of the present application.

FIG. 9 shows a schematic structural block diagram of a vehicle obstacle-avoidance apparatus according to an embodiment of the present application. As shown in FIG. 9, the apparatus includes: a memory 910 and a processor 920. A computer program that can be run on the processor 920 is stored in the memory 910. The processor 920 executes the computer program to implement the vehicle obstacle-avoidance method in the foregoing embodiment. The number of the memory 910 and the processor 920 may be one or more.

The apparatus further includes:

a communication interface 930 configured for communicating with external devices and performing data interactive transmission.

The memory 910 may include a high-speed RAM memory, and may also include a non-volatile memory, such as at least one magnetic disk memory.

In a case that the memory 910, the processor 920 and the communication interface 930 are implemented independently, the memory 910, the processor 920 and the communication interface 930 may be connected to each other through a bus for mutual communication. The bus may be an industry standard architecture (ISA) bus, a peripheral component interconnect (PCI) bus, or an extended industry standard architecture (EISA) bus. The bus may be divided into address bus, data bus, control bus, etc. For ease of representation, FIG. 9 shows only one thick line that represents the bus shown, but it does not mean that there is only one bus or one type of bus.

Optionally, in specific implementation, in a case that the memory 910, the processor 920 and the communication interface 930 are integrated on a single chip, the memory 910, the processor 920 and the communication interface 930 may communicate with each other through internal interfaces.

One embodiment of the present application provides a computer-readable storage medium that stores a computer program. The program is executed by a processor to implement the method in any of the above-mentioned embodiments.

In the description of this specification, descriptions with reference to the terms such as "one embodiment", "some embodiments", "example", "specific example", or "some examples" mean that specific feature, structure, materials or characteristics described in conjunction with the embodiment or example, are included in at least one embodiment or example of the present application. Moreover, the described specific features, structures, materials or characteristics may be combined in a suitable manner in any one or more embodiments or examples. In addition, those skilled in the art may combine the different embodiments or examples, and the characteristics of the different embodiments or examples described in this specification without contradicting each other.

In addition, the terms "first" and "second" are only used for descriptive purposes, and cannot be understood as indicating or implying relative importance or implicitly indicating the number of indicated technical features. Thus, features defined with "first" and "second" may explicitly or implicitly include at least one of the features. In the description of the present application, "plurality" means two or more than two, unless specifically defined otherwise.

Any process or method description in the flowchart or described in other ways herein may be understood as a module, segment or part of codes that include one or more executable instructions for implementing specific logical functions or steps of the process. Further, the scope of preferred embodiments of the present application includes additional implementations, which may not be implemented in orders as shown or discussed, including performing functions in a substantially simultaneous manner or in a reverse order according to functions involved. This should be understood by those skilled in the art to which the embodiments of the present application belong.

The logic and/or steps represented in the flowchart or described in other ways herein, for example, may be considered as a sequenced list of executable instructions, for implementing logic functions, and may be embodied in any computer-readable medium which may be used for an instruction execution system, apparatus or device (such as a computer-based system, a system including a processor or other system that can read and execute instructions from the instruction execution system, apparatus or device), or may be used in combination with the instruction execution system, apparatus or device. In the specification, "computer readable medium" may be any apparatus that may contain, store, communicate, propagate or transmit a program for use by or in combination with an instruction execution system, apparatus or device. More specific examples (non exhaustive list) of the computer-readable media include the following: an electrical connection unit (electronic apparatus) with one or more wiring, a portable computer cartridge (magnetic apparatus), a random access memory (RAM), a read-only memory (ROM), an erasable programmable read-only memory (EPROM or flash memory), an optical fiber apparatus, and portable read only memory (CDROM). In addition, the computer-readable medium may even be paper or other suitable medium on which the program can be printed, because the program can be obtained electronically and then stored in the computer memory, for example, by optically scanning the paper or other medium followed by editing, interpreting or other suitable processing if necessary.

It should be understood that each part of the present application may be implemented by hardware, software, firmware or a combination thereof. In the foregoing embodiments, multiple steps or methods may be implemented by software or firmware stored in a memory and executed by a suitable instruction execution system. For example, in a case that it is implemented by hardware, as in another embodiment, it can be implemented by any one or a combination of the following technologies known in the art: discrete logic circuits with logic gate circuits used to implement logic functions for data signals, application-specific integrated circuits with suitable combinational logic gate circuits, programmable gate array (PGA), and field programmable gate array (FPGA).

A person of ordinary skill in the art can understand that all or part of the steps in the method of the foregoing embodiments may be implemented by a program instructing relevant hardware to complete. The program may be stored in a computer-readable storage medium. In a case that the program is executed, one of the steps of the method embodiment or a combination thereof are implemented.

In addition, the functional units in the various embodiments of the present application may be integrated into one processing module, or each unit may exist alone physically, or two or more units may be integrated into one module. The foregoing integrated modules may be implemented in the form of hardware or software functional modules. In a case that the integrated module is implemented in the form of a software function module and sold or used as an independent product, it may also be stored in a computer-readable storage medium. The storage medium may be a read-only memory, a magnetic disk or an optical disk, etc.

Figure 10:
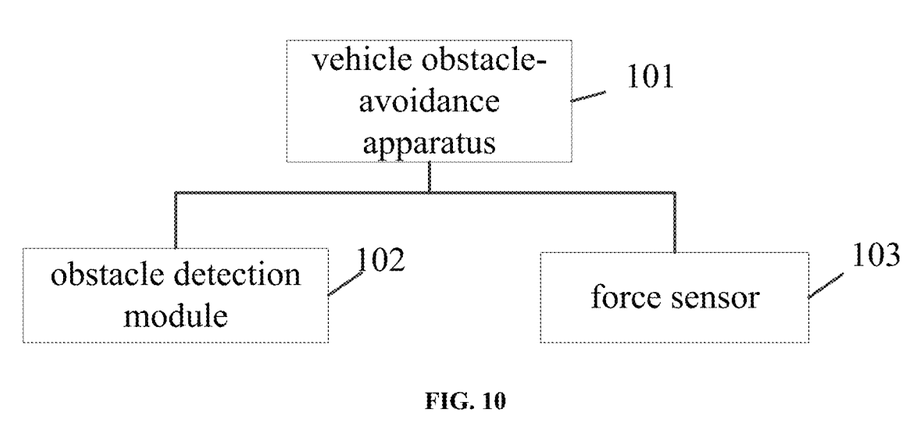
FIG. 10 shows a schematic structural diagram of a vehicle according to an embodiment of the present application.

FIG. 10 shows a schematic structural diagram of a vehicle according to an embodiment of the present application, including the vehicle obstacle-avoidance apparatus 101 in the foregoing embodiment. The specific content of the vehicle obstacle-avoidance apparatus may refer to the relevant description in the foregoing embodiment, which will not be not repeated here.

In one embodiment, referring to FIG. 10, the vehicle further includes:

an obstacle detection module 102 configured for detect obstacles, including obstacles in front of the vehicle and obstacles around a vehicle body. The obstacle detection module is connected to the vehicle obstacle-avoidance apparatus. The vehicle obstacle-avoidance apparatus acquires obstacle information according to data detected by the obstacle detection module.

The obstacle detection module 102 may include: a lidar sensor, an ultrasonic radar sensor, an image acquisition module, and/or other sensors. One arrangement mode of the obstacle detection module may refer to FIG. 4.

In one embodiment, the vehicle further includes a force sensor 103, which is connected to the vehicle obstacle-avoidance apparatus 101. One arrangement mode of the force sensor may refer to FIG. 5. The force sensor is used to detect force data of the vehicle before the vehicle starts to move and force data of the vehicle when the vehicle starts to move with an acceleration. The vehicle obstacle-avoidance apparatus is used to acquire the force data of the vehicle before the vehicle starts to move and the force data of the vehicle when the vehicle starts to move with an acceleration.

The above-mentioned content is only preferred embodiments of the present application, and it should be noted that the above-mentioned preferred embodiment should not be considered as limiting the present application, and the scope of protection of the present application should be based on the scope defined by the claims. It will be apparent to those skilled in the art that various modifications and variations can be made in the present application without departing from the spirit or scope of the application, and such modifications and variations are considered to be within the scope of the application.

What is claimed is:

1. A vehicle obstacle-avoidance method, implemented by circuits for implementing functions, comprising:
    acquiring obstacle information, in a case that an obstacle is detected;
    determining whether the obstacle is a straight-going obstacle in a planned route, according to the planned route and the obstacle information;
    acquiring a center-of-gravity position of a vehicle, a safe stopping distance and a vehicle current speed, in a case that the obstacle is determined as the straight-going obstacle in the planned route;
    determining a maximum acceleration of the vehicle, according to the center-of-gravity position; and
    determining a straight-going obstacle-avoidance strategy, according to the obstacle information, the maximum acceleration, the safe stopping distance and the vehicle current speed;
    wherein the acquiring the center-of-gravity position of the vehicle comprises:
    acquiring force data of a plurality of preset force measurement points of the vehicle before the vehicle starts to move and force data of the plurality of preset force measurement points of the vehicle when the vehicle starts to move with an acceleration;
    determining the center-of-gravity position, according to the force data of the plurality of preset force measurement points of the vehicle before the vehicle starts to move, the force data of the plurality of preset force measurement points of the vehicle when the vehicle starts to move with the acceleration, and positions of the preset force measurement points.

2. The method of claim 1, wherein the determining the maximum acceleration of the vehicle according to the center-of-gravity position, comprises:
    determining an acceleration at which the vehicle is in a critical state of overturning during deceleration as the maximum acceleration, according to the center-of-gravity position.

3. The method of claim 1, wherein the determining the straight-going obstacle-avoidance strategy, comprises: determining a deceleration-for-obstacle-avoidance position and an obstacle-avoidance acceleration.

4. The method of claim 3, wherein the determining the deceleration-for-obstacle-avoidance position, comprises:
    determining a deceleration distance for the vehicle to execute the straight-going obstacle-avoidance strategy, according to the vehicle current speed and the obstacle-avoidance acceleration; and
    determining the deceleration-for-obstacle-avoidance position, according to the obstacle information, the deceleration distance and the safe stopping distance, wherein a distance between the deceleration-for-obstacle-avoidance position and the obstacle is less than a sum of the deceleration distance and the safe stopping distance.

5. The method of claim 4, further comprising:
    updating a distance between the vehicle and the obstacle in real time, according to a time stamp of the obstacle information and a driving trajectory of the vehicle; and
    decelerating with the obstacle avoidance-acceleration, in a case that the distance between the vehicle and the obstacle is less than the sum of the deceleration distance and the safe stopping distance.

6. The method of claim 1, further comprising:
    executing an obstacle-for-rotation avoidance strategy in a case that the obstacle is determined as an obstacle-for-rotation, according to the planned route and the obstacle information; wherein the obstacle-for-rotation comprises an obstacle located in a rotation area defined in the planned route; and
    the obstacle-for-rotation avoidance strategy comprises:
    controlling the vehicle to stop rotating, in a case that the vehicle is currently performing rotation according to the planned route; and
    controlling the vehicle not to perform rotation, in a case that the vehicle has not performed rotation according to the planned route.

7. A vehicle obstacle-avoidance apparatus, implemented by circuits for implementing functions, comprising:
    one or more processors; and
    a storage device for storing one or more programs;
    wherein the one or more programs are executed by the one or more processors to perform operations of:
    acquiring obstacle information, in a case that an obstacle is detected;
    determining whether the obstacle is a straight-going obstacle in a planned route, according to the planned route and the obstacle information;
    acquiring a center-of-gravity position of a vehicle, a safe stopping distance and a vehicle current speed, in a case that the obstacle is determined as the straight-going obstacle on the planned route;
    determining a maximum acceleration of the vehicle, according to the center-of-gravity position; and determining a straight-going obstacle-avoidance strategy, according to the obstacle information, the maximum acceleration, the safe stopping distance and the vehicle current speed;

wherein the acquiring the center-of-gravity position of the vehicle comprises:

acquiring force data of a plurality of preset force measurement points of the vehicle before the vehicle starts to move and force data of the plurality of preset force measurement points of the vehicle when the vehicle starts to move with an acceleration;

determining the center-of-gravity position, according to the force data of the plurality of preset force measurement points of the vehicle before the vehicle starts to move, the force data of the plurality of preset force measurement points of the vehicle when the vehicle starts to move with the acceleration, and positions of the preset force measurement points.

8. The apparatus of claim 7, wherein the determining the maximum acceleration of the vehicle according to the center-of-gravity position, comprises:

determining an acceleration at which the vehicle is in a critical state of overturning during deceleration as the maximum acceleration, according to the center-of-gravity position.

9. The apparatus of claim 7, wherein the one or more programs are executed by the one or more processors to perform operations of:

determining a deceleration-for-obstacle-avoidance position; and determining an obstacle-avoidance acceleration;

wherein the one or more programs are executed by the one or more processors to perform further operations of determining a deceleration distance for the vehicle to execute the straight-going obstacle-avoidance strategy, according to the vehicle current speed and the obstacle-avoidance acceleration; and determining the deceleration-for-obstacle-avoidance position, according to the obstacle information, the deceleration distance and the safe stopping distance, wherein a distance between the deceleration-for-obstacle-avoidance position and the obstacle is less than a sum of the deceleration distance and the safe stopping distance.

10. The apparatus of claim 9, wherein the one or more programs are executed by the one or more processors to perform operations of:

updating a distance between the vehicle and the obstacle in real time, according to a time stamp of the obstacle information and a driving trajectory of the vehicle; and decelerating with the obstacle-avoidance acceleration, in a case that the distance between the vehicle and the obstacle is less than the sum of the deceleration distance and the safe stopping distance.

11. The apparatus of claim 7, wherein the one or more programs are executed by the one or more processors to perform operations of:

executing an obstacle-for-rotation avoidance strategy in a case that the obstacle is determined as an obstacle for rotation, according to the planned route and the obstacle information;

wherein the obstacle-for-rotation comprises an obstacle located in a rotation area defined in the planned route;

the obstacle-for-rotation avoidance strategy comprises:

controlling the vehicle to stop rotating, in a case that the vehicle is currently performing rotation according to the planned route; and controlling the vehicle not to perform rotation, in a case that the vehicle has not performed rotation according to the planned route.

12. A vehicle, comprising the vehicle obstacle-avoidance apparatus of claim 7.

13. A non-transitory computer readable storage medium storing a computer program, implemented by circuits for implementing functions, wherein the program is executed by a processor to perform operations of:

acquiring obstacle information, in a case that an obstacle is detected;

determining whether the obstacle is a straight-going obstacle in a planned route, according to the planned route and the obstacle information;

acquiring a center-of-gravity position of a vehicle, a safe stopping distance and a vehicle current speed, in a case that the obstacle is determined as the straight-going obstacle in the planned route;

determining a maximum acceleration of the vehicle, according to the center-of-gravity position; and determining a straight-going obstacle-avoidance strategy, according to the obstacle information, the maximum acceleration, the safe stopping distance and the vehicle current speed;

wherein the acquiring the center-of-gravity position of the vehicle comprises:

acquiring force data of a plurality of preset force measurement points of the vehicle before the vehicle starts to move and force data of the plurality of preset force measurement points of the vehicle when the vehicle starts to move with an acceleration;

determining the center-of-gravity position, according to the force data of the plurality of preset force measurement points of the vehicle before the vehicle starts to move, the force data of the plurality of preset force measurement points of the vehicle when the vehicle starts to move with the acceleration, and positions of the preset force measurement points.

* * * * *